United States Patent [19] [11] 4,389,588
Rankin [45] Jun. 21, 1983

[54] CURRENT CARRYING CONSTANT FORCE BRUSH HOLDER ASSEMBLY

[76] Inventor: Alexander Rankin, c/o Vulcan Spring & Mfg. Co., 1458 County Line Rd., Huntingdon Valley, Pa. 19006

[21] Appl. No.: 361,336

[22] Filed: Mar. 24, 1982

[51] Int. Cl.[3] .............................................. H02K 13/00
[52] U.S. Cl. ...................................... 310/242; 310/245
[58] Field of Search ............... 310/238, 239, 240, 241, 310/242, 245, 246, 247, 249, 244

[56] References Cited

U.S. PATENT DOCUMENTS

| | | | |
|---|---|---|---|
| 714,811 | 12/1902 | Litchfield | 310/247 |
| 2,199,532 | 5/1940 | Weeks | 171/326 |
| 2,615,939 | 10/1952 | Mitchell | 171/323 |
| 2,695,968 | 11/1954 | Welch et al. | 310/246 |
| 2,748,301 | 5/1956 | Spielman | 310/241 |
| 3,025,421 | 3/1962 | Sievert | 310/245 |
| 3,376,444 | 4/1968 | Eaton, Jr. et al. | 310/249 |
| 3,387,156 | 6/1968 | Elow et al. | 310/247 |
| 3,430,084 | 2/1969 | Hall et al. | 310/242 |
| 3,430,915 | 3/1969 | Vogelberger | 310/245 |

*Primary Examiner*—R. Skudy
*Attorney, Agent, or Firm*—Howson and Howson

[57] ABSTRACT

A brush holder assembly for electrically-coupling relatively movable conductors comprises a brush holder having a cavity which slidably receives a brush and having a pair of shoulders located on opposite sides of the cavity to confront a conductor. An electrically-conductive twin coil spring is mounted in the cavity with its saddle portion engaging one end of the brush and its coils disposed adjacent the shoulders for biasing the other end of the brush into contact with the conductor. An electrical contact member is interposed between at least one of the shoulders and its engaged spring coil to provide a current path into the side of the brush adjacent the coil for improving the overall performance of the brush assembly.

3 Claims, 3 Drawing Figures

CURRENT CARRYING CONSTANT FORCE BRUSH HOLDER ASSEMBLY

FIELD OF THE INVENTION

The present invention relates to brush holder assemblies for electric machines, and more particularly, the present invention relates to a brush holder of the type which utilizes a constant force twin coil spring member to provide brush pressure.

BACKGROUND OF THE INVENTION

It has been known to utilize an electrically conductive helical coil spring to provide electrical communication between the one end of a brush and a source of electricity. An example of such a device may be found in U.S. Pat. No. 3,376,444. An example of a brush holder utilizing a constant force spring through which current is flowed to the outer end of the brush may be found in U.S. Pat. No. 3,387,156 with particular reference being made to the embodiment illustrated in FIG. 6 thereof. An example of a brush assembly utilizing a constant force twin coil spring may be found in U.S. Pat. No. 2,695,968, and particularly the embodiment illustrated in FIG. 6 thereof.

Although each of the patented brush assemblies may function satisfactorily for its intended purpose, each has certain limitations. For instance, with respect to the twin coil spring brush assembly, electrical communication between an electricity source and the brush is provided by means of a braided or twisted wire having one end connected to the brush and another end connected to a suitable source of electricity. The disadvantage of this construction is that the wire, or shunt as the wire is called in the art, has a certain stiffness which, when combined with the spring, provides a spring system having a gradient which cannot be predicted with any degree of accuracy. This makes it difficult, if not impossible, for engineers to calculate the design of the twin coil springs. The effect on the spring system occurs whether or not the shunt is connected into the brush itself or is interposed between the underside of the saddle portion of the twin coil spring and the outer end of the brush as has been proposed in the art. A further disadvantage of this arrangement resides in the fact that the current flows the entire length of the brush. This is undesirable because it may cause the brush to heat up in use and, therefore, to wear prematurely under certain operating conditions. Accordingly, an improved brush assembly which overcomes these limitations is highly desirable.

OBJECTS OF THE INVENTION

With the foregoing in mind, a primary object of the present invention is to provide a brush holder assembly which overcomes the limitations of prior art brush holder assemblies.

Another object of the present invention is to provide a novel brush holder assembly which operates to improve the service life of brushes used therein.

A further object of the present invention is to provide an improved brush holder assembly having a spring system which ensures reliable, predictable performance of the brush used therein.

SUMMARY OF THE INVENTION

More specifically, the present invention provides a brush holder assembly comprising a holder having a cavity adapted slidably to receive a brush and a pair of shoulders on opposite sides of the cavity adapted to confront the rotor in an electric machine. A twin coil spring is mounted in the cavity with its saddle portion engaging the outer end of a brush, its coils disposed adjacent the shoulders of the holder, and its uncoiled portions extending along opposite sides of the brush. An electrical contact member carried by the holder has a portion interposed between at least one of the shoulders and its corresponding spring coil, and means is provided to couple the contact member with a source of electricity. With this construction, current flows to the coil and into the side of the brush, thereby flowing in a relatively short path to the rotor and improving the overall performance of the brush.

BRIEF DESCRIPTION OF THE DRAWINGS

The foregoing and other objects, features and advantages of the present invention should become apparent from the following descriptions when taken in conjunction with the accompanying drawings, in which.

DESCRIPTION OF THE PREFERRED EMBODIMENTS

Figure 1:
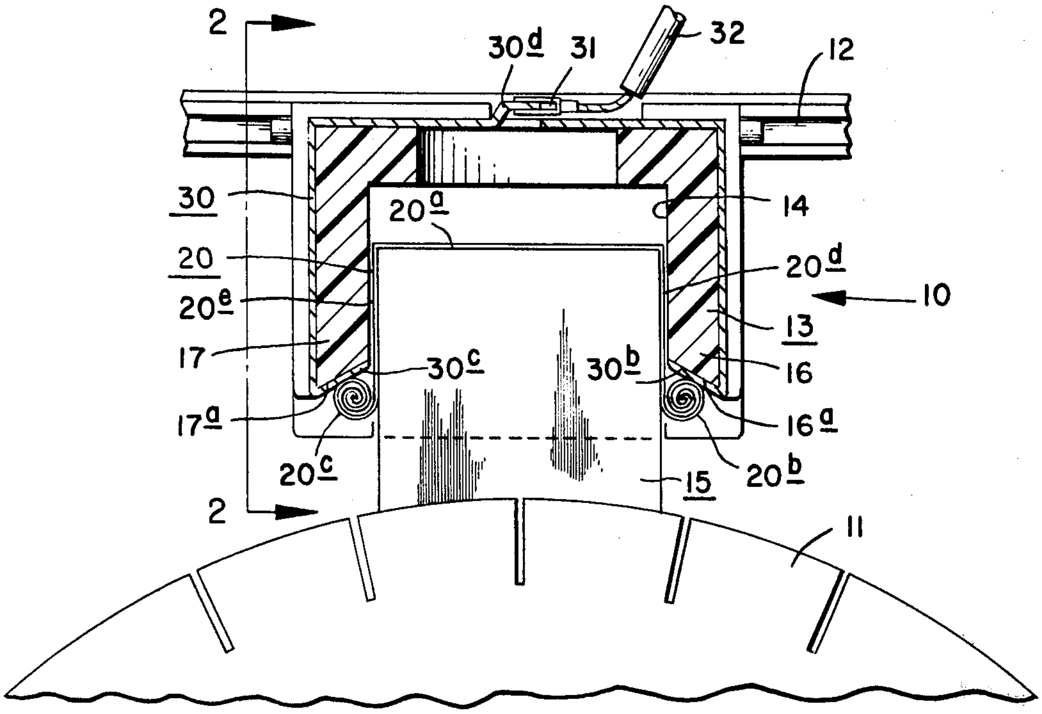
FIG. 1 is an enlarged, fragmentary, partially-sectioned view of an improved brush holder assembly which embodies the present invention.

Referring now to the drawings, FIG. 1 illustrates a brush assembly 10 which embodies the present invention. The brush assembly 10 is particularly suited for use in supplying power to the rotor 11 of an electric machine, such as a small electric motor as may be found in a variety of applications, including vacuum cleaners, portable tools, etc. In the illustrated embodiment, the motor casing is provided with a slide 12 spaced from the periphery of the rotor 11 for mounting the brush assembly 10 adjacent the rotor 11. Another like brush assembly 10 is similarly mounted on the diametrically opposite side of the rotor 11 in the motor housing. Additional assemblies may be mounted as required.

The brush assembly 10 comprises a brush holder 13 having a cavity 14 which slidably mounts a brush 15 for radial movement with respect to the rotor 11. The brush holder 13 is preferably fabricated of metal or plastic and has a pair of depending end portions 16 and 17 which terminate at their lower ends in shoulders **16*a* and 17*a*, respectively. A twin coil spring 20 preferably of beryllium copper or like conductive metal is mounted in the cavity 14 and has a saddle portion 20*a* engaging the outer end of the brush 15 and a pair of coils 20*b* and 20*c* disposed below the shoulder surfaces 16*a* and 17*a*, respectively. Preferably, the surfaces of the shoulders 16*a* and 17*a* are inclined toward opposite sides of the brush to assist in positioning the twin coil spring 20 in the holder 13. The twin coil spring 20 also has portions 20*d* and 20*e* which, when unwound from the coils 20*b* and 20*c* as shown, extend along and engage opposite sides of the brush 15**.

Figure 2:
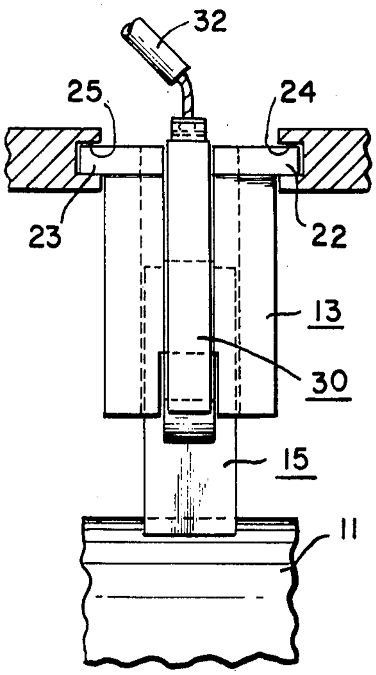
FIG. 2 is an end view taken on line 2—2 of FIG. 1.

There are many ways in which the brush holder 13 can be mounted in the housing of an electric machine. One such mounting arrangement is illustrated in FIG. 2. As seen therein, the brush holder 13 has a pair of flanges 22 and 23 engaging in slots 24 and 25, respectively provided by the holder mounting slide 12 secured in the machine casing. Thus, the brush holder 13 is restrained from outward movement relative to the rotor 11 while affording lateral engagement and disengagement of the brush holder 13.

As described thusfar, the brush holder assembly 13 is conventional. As well known in the art the twin coil spring functions, when disposed in the configuration illustrated in FIG. 1, to apply a substantially constant inward force to the brush 15, thereby causing the brush 15 to engage the periphery of the rotor 11 with a substantially constant pressure irrespective of the position of the brush 15 in its holder. Hence, the biasing force remains substantially constant throughout the life of the brush, being unaffected by changes in brush length due to wear. In prior art assemblies, a shunt was affixed either to the outer end of the brush 15 or it was interposed beneath the saddle 20*a* and the outer end of the brush 15. As noted heretofore, however, both of these prior art approaches have been undesirable for a number of reasons.

In accordance with the present invention, the disadvantages of the prior art brush holder assemblies, including the design problems and brush wear problems, are overcome by the brush holder assembly 13 of the present invention. To this end, the electricity is supplied to the brush 15 laterally at locations adjacent the coils of the twin coil spring. This has the advantage of establishing a relatively short current path through the brush and simultaneously eliminating the design problems noted heretofore.

Referring again to FIG. 1, electrical current is supplied to the brush 15 by means of an electrical contact member 30 of copper or other conductive metal. The contact member 30 has a generally U-shaped configuration with inturned lower ends 30*b* and 30*c* which are disposed against the inclined shoulder surfaces 16*a* and 17*a* of the depending end portions 16 and 17 of the brush holder 13. The outer portion of the electrical contact member 30 has an upwardly struck tab 30*d* adapted to be releasably engaged by a clip 31 provided on the end of a length of insulated wire 32 connected to a source of electricity. The electrical contact member 30 may be prebent and snapped into a peripheral groove molded in the brush holder 13 as shown; or the contact member 30 may be molded integral with the holder 13. Regardless of which mounting technique may be employed, the important consideration is that the contact member have at least one electrically conductive surface which engages at least one of the coils of the twin coil spring 20.

In the embodiment of FIGS. 1 and 2, both of the twin coil spring coils 20*b* and 20*c* bear against the underside of the inturned portions 30*b* and 30*c* of the electrical contact member 30. As a result, current flowing through the insulated wire 32 to the electrical contact member 30 passes inwardly along opposite sides of the holder 13 to the inturned portions 30*b* and 30*c* of the electrical contact member 30. The current then flows into the coils 20*b* and 20*c* of the twin coil spring 20, and after flowing around the coils 20*b* and 20*c*, the current flows laterally into the brush 15 by virtue of the intimate contact between the twin coil spring 20 and the brush 15 in the zone of the spring coils 20*b* and 20*c*. Because the uncoiled portions 20*d* and 20*e* of the spring 20 are constrained within the brush holder cavity 14, they tend to bear against opposite sides of the brush 15 and thereby provide positive electrical communication between the twin coil spring 20 and the brush 15. Thus, the flow path of current between the coils 20*b* and 20*c* and the periphery of the rotor 11 is quite short, and the length of the current path stays relatively constant irrespective of changes in the length of the brush as it wears. Since the current need not flow through the entire length of the brush, there is less of a tendency for the brush to overheat in use and, therefore, to wear prematurely. This arrangement also provides the additional advantage of being less expensive to manufacture and easier to assemble because it does not require either a brush having a shunt embedded therein or other arrangements for connecting the brush to a source of electricity. Furthermore, because of the absence of the brush shunt, the brush holder spring system can be designed with a degree of accuracy not heretofore possible with prior art brush assemblies.

Figure 3:
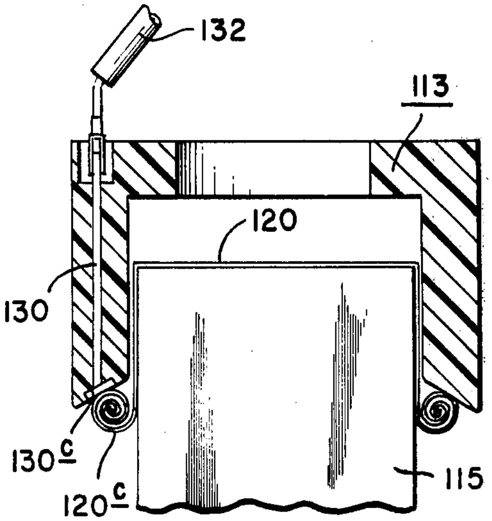
FIG. 3 is a view similar to FIG. 1, but illustrating a modified embodiment of the present invention.

In the embodiment illustrated in FIGS. 1 and 2, the current is supplied to both of the coils of the twin coil spring and thence to the brush 15. If desired, however, a modified embodiment wherein current is supplied to only one of the spring coils may be used in those applications where the current carrying requirements are lower. In the modified embodiment of FIG. 3, a twin coil spring 120 engages a brush 115 and applies pressure in the same manner as described heretofore; however, in this embodiment, the brush holder 113 has a single electrical contact member 130 which terminates in a shoulder or surface 130*c* engaging only one of the coils 120*c* of the twin coil spring 120. Electrical power is supplied to the contact member 130 via an insulated wire 132 clipped to the contact member 130. Operation is the same as in the embodiment of FIGS. 1 and 2 except that current flow is into only one side of the brush rather than into both sides. As in the preceding embodiment, the electrical contact member 130 may be molded integral with the brush holder 113 or may be snapped into place or otherwise secured to the brush holder 113 to provide the desired contact surface.

In view of the foregoing, it should be apparent that the present invention now provides an improved brush assembly which overcomes the limitations of prior art brush assemblies. The brush assembly of the present invention is easier to design, easier to assemble, and easier to maintain. Moreover, the design of the brush assembly is such as to contribute to extending the service life of the brush used therein.

In both illustrated embodiments, the brush assembly of the present invention is shown cooperating with a cylindrical commutator in an electric motor or generator. It should be understood, however, that the brush assembly of the present invention can be used with equal benefit in an electric motor or generator having a so-called face commutator, i.e., a commutator where the contact strips extend radially on one end of the rotor rather than axially. Moreover, the brush assembly of the present invention can be used effectively with slip rings in various applications where there is a need to conduct electricity to or from relatively rotating members as, for example, the slip rings in an alternator or in a cord reel. The brush assembly of the present invention may also be used effectively in applications where the brush holder moves linearly relative to a conductor.

Thus, while two preferred embodiments of the present invention have been illustrated and described in detail, various modifications, alterations and changes may be made without departing from the spirit and scope of the present invention as defined in the appended claims.

I claim:

1. For use in making electrical contact between relatively movable electrical conductors, a brush holder assembly comprising:

a brush holder having a brush-receiving cavity and a pair of shoulders disposed on opposite sides of said cavity and adapted to confront a movable conductor, a brush slidably received in said cavity, said brush having an outer end and an inner end adapted to engage said movable conductor, a twin coil spring of electrically-conductive metal mounted in said holder, said twin coil spring having a pair of coils disposed on opposite sides of said brush and an integral saddle engaging the outer end of said brush, said twin coil spring between said coils and said saddle portion adapted to engage opposite sides of said brush and provide electrical communication between said coils and brush, and means providing an electrical contact between at least one of said shoulders and its respective coil of said twin coil spring, whereby a relatively short current path is provided between the spring coil and the brush.

2. The brush holder assembly according to claim 1 wherein said electrical contact means includes an electricallyconductive member interposed between said one shoulder and said spring coil, and means connecting said conductive member to a source of electricity.

3. The brush holder assembly according to claim 1 wherein said electrical contact means includes a conductive member having a pair of contact portions disposed between said shoulders of said holder and said coils of said twin coil spring, and means connecting said conductive member to a source of electricity.

* * * * *